S. H. NORTON.
STEADY REST.
APPLICATION FILED MAY 12, 1919.
1,370,705.
Patented Mar. 8, 1921.
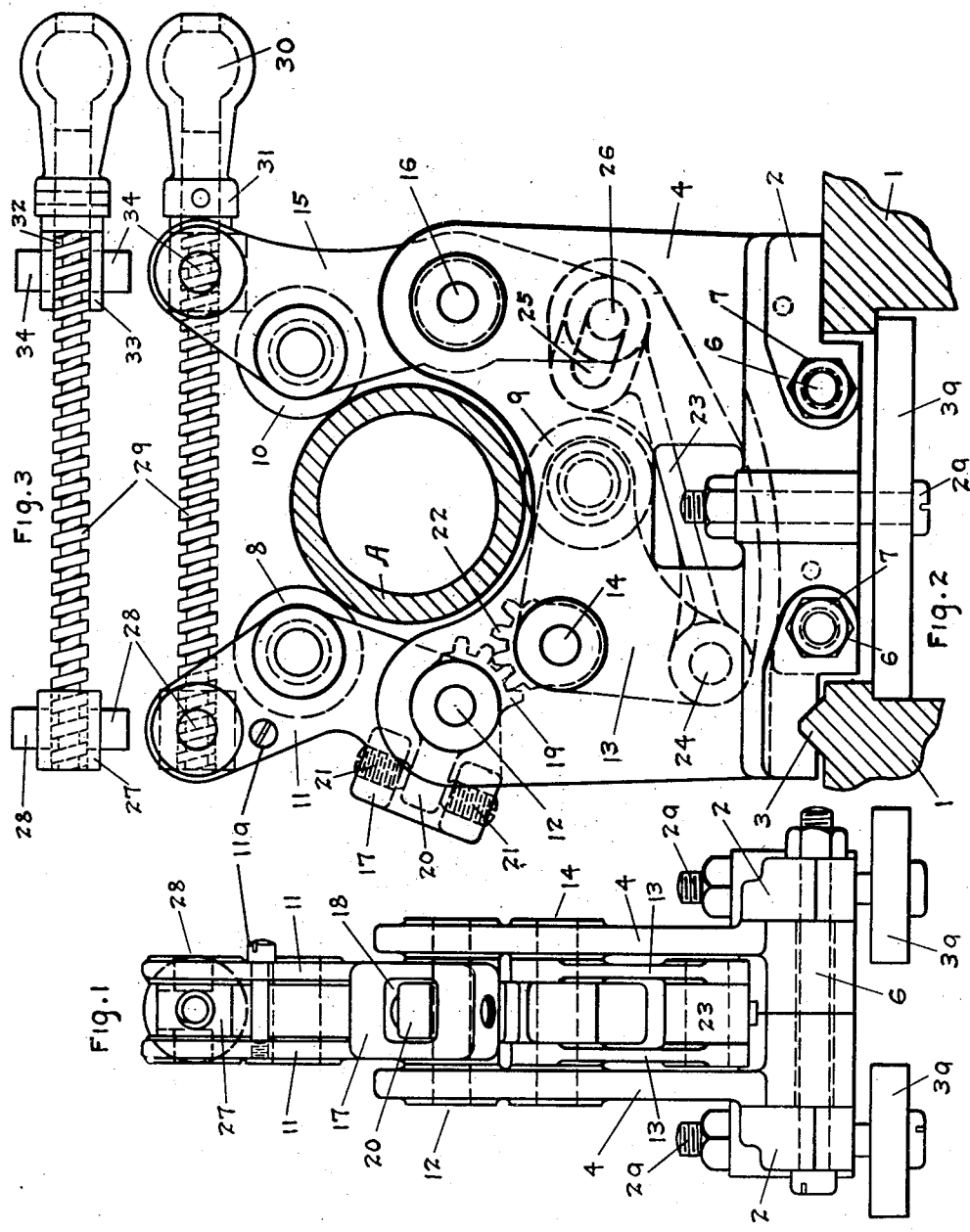
Inventor
Samuel H. Norton
By N. L. Lord
Attorney

UNITED STATES PATENT OFFICE.

SAMUEL HARRY NORTON, OF MEADVILLE, PENNSYLVANIA, ASSIGNOR TO McCROSKY TOOL CORPORATION, OF MEADVILLE, PENNSYLVANIA, A CORPORATION OF PENNSYLVANIA.

STEADY-REST.

1,370,705.     Specification of Letters Patent.     Patented Mar. 8, 1921.

Application filed May 12, 1919. Serial No. 296,669.

*To all whom it may concern:*

Be it known that I, SAMUEL H. NORTON, a citizen of the United States, residing at Meadville, in the county of Crawford and State of Pennsylvania, have invented new and useful Improvements in Steady-Rests, of which the following is a specification.

This invention relates to steady rests and consists in certain improvements in the construction thereof as will be hereinafter fully described and pointed out in the claims.

Steady rests, as commonly made, provide a series of work-engaging surfaces, usually three, and these are individually adjusted to the work. The present invention contemplates the formation of a steady rest in which the work-engaging surfaces may be simultaneously adjusted.

The invention is illustrated in the accompanying drawings as follows:—

Figure 1 is a rear elevation of the steady rest.

Fig. 2 a side elevation.

Fig. 3 a plan view of the adjusting screw and immediately connected parts.

1 marks the lathe or tool bed, 2 base plates for the steady rest, these plates having guide surfaces 3 which normally rest on the bed of the tool, 3ª clamping plates, and 2ª clamping bolts for clamping the base plates in position on the tool bed. The steady rest frame is formed of the opposing sides 4 and these are arranged between the base plates. Bolts 6 extend through the base plates and the frame sides clamping the whole together. The openings 7 in the frame pieces 4 and 5 are slightly elongated as shown in dotted lines in Fig. 2 so as to permit a slight forward and back adjustment of the frame relatively to the base plate.

The work-engaging bearings are formed in the exemplification here shown by the rollers 8, 9 and 10 operating on a piece of work A. The roller 8 is carried by a forked support 11 and the support 11 is swingingly mounted between the side frames on a pin 12 which extends through the side frames. The roller 9 is mounted on a forked support 13 which is swingingly mounted between the side frames on a pin 14, the pin extending through the side frames and the roller 10 is mounted on a forked support 15 swingingly mounted on a pin 16 which extends through the side frames.

The support 11 has an arm 17 thereon and an opening 18 extending through the support and through this arm. A gear 19 is mounted on the pin 12 and has an arm 20 extending into the opening 18. Screws 21 extend through the arms 17 into the opening 18 against the arm 20. By means of these screws the position of the gear 19 may be nicely adjusted. A gear 22 is fixed on the support 13 and meshes with the gear 19 so that the support 13 swings with the support 11. As the support 11 swings to carry the roll 8 inwardly the support 13 swings to carry the roll 9 toward the center of the work. A link 23 is connected by a pin 24 with the support 13 and is provided with a slot 25 through which a pin 26 extends, the pin extending through the support 15. The link compels an outward movement of the roll 10 with an outward movement of the roll 9 but permits of an outward movement of the roll 10 independently of the other rolls so as to permit the insertion of the work.

A nut 27 is pivotally mounted in arms extending from the support 11 by means of trunnions 28. A screw 29 operates in the nut 27. The screw is provided with a handle 30, the handle forming a shoulder 31. The screw may be dropped into a slot 32 in a block 33, the block 33 being pivotaly mounted in the support 15 by means of the trunnions 34. A screw 11ª draws the sides of the support 11 together to give sufficient frictional engagement on the nut 27 to hold the screw in elevated position when raised.

It will be readily seen that as the screw is operated the supports 11 and 15 may be drawn toward each other, thus moving the rolls 8 and 9 toward the center of the work. The movement of the support 11 compels a similar movement of the support 13 through the gears 19 and 22. It follows, therefore, that the rolls are moved inwardly simultaneously and equally with relation to the center. When it is desired to remove the work the handle 30 may be lifted, thus freeing the support 15 and it may be swung outwardly the slot 25 permitting this outward movement with relation to the link. This outward movement is ordinarily sufficient to permit the withdrawal of the work without disturbing the other parts.

While I have shown the mechanism as mounted between the side frames and have shown the adjusting mechanism as swingingly mounted I do not wish to be limited at least in the broader phases of the invention to such construction.

What I claim as new is:—

1. In a steady rest, the combination of a series of work-engaging bearings engaging the work at points extending over more than one hundred and eighty degrees; swinging supports for said bearings; and means adapted to be opened at one side to permit a lateral insertion of the work, said means connecting said supports and compelling them to swing in unison carrying said bearings toward and from a common center.

2. In a steady rest, the combination of a series of work-engaging bearings engaging the work at points extending over more than one hundred and eighty degrees; swinging supports for said bearings; and means adapted to be opened at one side to permit a lateral insertion of the work, said means connecting said supports and compelling them to swing in unison carrying said bearings equal distances toward and from a common center.

3. In a steady rest, the combination of a series of work-engaging bearings; swinging supports for said bearings; and links connecting said supports and compelling a simultaneous movement of said supports carrying said bearings toward and from a common center.

4. In a steady rest, the combination of a series of work-engaging bearings engaging the work at points extending over more than one hundred and eighty degrees; swinging supports for said bearings; connections between said supports compelling a simultaneous movement of said supports carrying said bearings toward and from a common center, said connections being adapted to be opened at one side to permit the lateral insertion of the work; and means for locking said supports in adjustment.

5. In a steady rest, the combination of a frame comprising opposing sides; a series of work-engaging bearings; supports for said bearings mounted between said sides; and means for simultaneously moving said supports to adjust said bearings toward and from a common center.

6. In a steady rest, the combination of a series of at least three work-engaging bearings engaging the work at points extending over more than one hundred and eighty degrees; at least three supports for said bearings; means for simultaneously moving said supports to adjust said bearings toward and from a common center; a frame on which said bearings are mounted; base plates for said frame; and means for adjusting the frame relatively to the base plates.

7. In a steady rest, the combination of a frame; swinging supports on said frame; a gear connection between two supports compelling a uniform inward and outward movement of said supports; and means for adjusting one of the gears to adjust the relation between said supports.

8. In a steady rest, the combination of a frame; a series of work-engaging bearings; supports for said bearings mounted on said frame; a nut in one of said supports; and a screw operating in said nut and engaging another of said supports for adjusting said supports.

9. In a steady rest, the combination of a frame; a series of work-engaging bearings; supports for said bearings mounted on said frame; a nut pivotally mounted on one of said supports; a screw operating in said nut; a slotted block arranged in a second of said supports; and means on the screw for engaging the block whereby the screw may be lifted and the supports moved independently of the screw and the screw returned to the slotted block for adjusting the supports.

10. In a steady rest, the combination of a frame; two supports pivotally mounted on the frame; a gear connection between said supports; a third support; a link connection between the third support and one of the other supports, said link connection permitting a movement of one of the supports in one direction relatively to the link; and means for adjusting said supports to lock them in adjustment.

11. In a steady rest, the combination of a frame; a series of work-engaging bearings; supports for said bearings mounted on said frame; a nut pivotally mounted on one of said supports; a screw operating in said nut; means on the screw for engaging another of said supports; and means for yieldingly holding the nut in the position to which it may be adjusted by swinging the screw.

In testimony whereof I have hereunto set my hand.

SAMUEL HARRY NORTON